United States Patent
Wallace et al.

[11] Patent Number: 6,118,680
[45] Date of Patent: Sep. 12, 2000

[54] METHODS AND APPARATUS FOR LOAD SHARING BETWEEN PARALLEL INVERTERS IN AN AC POWER SUPPLY

[75] Inventors: Kenneth Andrew Wallace, Lewis Center; Gueorgui I. Mantov, Lexington; Jon Drew Karnes; John Roller, both of Galion, all of Ohio

[73] Assignee: PECO II, Galion, Ohio

[21] Appl. No.: 09/322,726

[22] Filed: May 28, 1999

[51] Int. Cl.[7] .................................................. H02M 7/00
[52] U.S. Cl. ............................................................ 363/71
[58] Field of Search .............................. 363/71, 16, 131, 363/123

[56] References Cited

U.S. PATENT DOCUMENTS

| | | | |
|---|---|---|---|
| 3,621,365 | 11/1971 | Beck et al. | |
| 4,171,517 | 10/1979 | Higa et al. | |
| 4,667,116 | 5/1987 | Honjo et al. | 307/64 |
| 4,694,388 | 9/1987 | Lösel | 363/72 |
| 4,733,341 | 3/1988 | Miyazawa | 363/71 |
| 4,924,170 | 5/1990 | Henze | 323/272 |
| 5,036,452 | 7/1991 | Loftus | 363/71 |
| 5,212,630 | 5/1993 | Yamamoto et al. | 363/71 |
| 5,257,180 | 10/1993 | Sashida et al. | 363/71 |
| 5,262,935 | 11/1993 | Shirahama et al. | 363/71 |
| 5,446,645 | 8/1995 | Shirahama et al. | 363/71 |
| 5,473,528 | 12/1995 | Hirata et al. | 363/71 |
| 5,559,686 | 9/1996 | Patel et al. | 363/71 |
| 5,745,355 | 4/1998 | Tracy et al. | 363/71 |
| 5,745,356 | 4/1998 | Tassitino, Jr. et al. | 363/71 |
| 5,793,191 | 8/1998 | Elmore et al. | 323/272 |
| 5,886,888 | 3/1999 | Akamatsu et al. | 363/71 |

OTHER PUBLICATIONS

*Parallel Redundant Operation of UPS With Robust Current Minor Loop,* Youichi Ito and Osamu Iyama, Sandken Electric Co., Ltd., 1997, PCC–Nagaoka '97, pp. 489–493, No Month.

*Primary Examiner*—Shawn Riley
*Attorney, Agent, or Firm*—Marshall, O'Toole, Gerstein, Murray & Borun

[57] ABSTRACT

Methods and apparatus are disclosed for achieving load balance between parallel inverters in an AC power supply. Load balancing reduces undesirable cross conduction current between the parallel inverters. Load balancing and the resulting reduction in cross conduction current are achieved without the need for common control circuitry between the parallel inverters. Thus, the single-fault protection offered by redundant parallel inverters is not compromised by the disclosed load balancing techniques.

29 Claims, 10 Drawing Sheets

METHODS AND APPARATUS FOR LOAD SHARING BETWEEN PARALLEL INVERTERS IN AN AC POWER SUPPLY

RELATED APPLICATION

This application is related to U.S. application Ser. No. 09/323/85, filed May 28, 1999.

FIELD OF THE INVENTION

The invention relates generally to power supplies, and, more particularly, to an apparatus for load sharing between parallel inverters in AC power supplies.

BACKGROUND OF THE INVENTION

Many applications have a need for a reliable power source. For example, telecommunication systems typically demand a DC power supply of high availability. Battery plants have been developed to satisfy these DC power demands. However, many applications also require AC power supplies of high availability. For example, modern telecommunication systems also rely on AC powered equipment to perform various monitoring and control functions. Such AC powered equipment is often as critical to successful operation of the telecommunication system as the DC powered equipment mentioned above. Accordingly, highly reliable AC power sources are needed in such applications.

Understandably, telecommunication companies are often reluctant to bring commercial AC power into intimate contact with critical loads. This reluctance is rooted in several issues including the risk of power outages and the risk of transients that can potentially damage parts of the telecommunication equipment, both of which are associated with such commercial power systems. Telecommunication companies, thus, often employ uninterruptible power supplies to provide their AC supply needs.

However, standard uninterruptible power supply (UPS) systems require a major investment in resources. For example, such systems often require purchase of a separate battery plant to avoid compromising the prime DC source. A more cost effective approach to providing a UPS system is to employ a redundant inverter system operating off the existing telecommunication battery that is entirely isolated from utility power. However, the inverters in these redundant inverter systems have some unique requirements. For example, while N+1 redundancy (i.e., including at least one more power supply than is needed to supply the load) can be used to achieve high availability DC power in a fairly straightforward manner, applying N+1 redundancy to AC power supplies is more complicated. Specifically, when connecting multiple inverters in parallel to achieve N+1 redundancy in the AC context, it is necessary to match both the phase and the amplitude of the parallel inverters in order to achieve equal load sharing. A failure to properly load share results in undesirable cross conduction current flowing between the inverters. In the prior art, phase and amplitude matching is performed with common synchronization and load share circuitry which couples the parallel inverters together. Unfortunately, such common circuitry inherently compromises the redundancy advantage by rendering the system susceptible to "single fault" failures in the common circuits that can disrupt the AC power supply. In fact, failure in the common synchronization or signaling circuits can bring down the whole inverter system.

Prior art systems that employ common load share circuitry between parallel inverters typically utilize an isolation circuit and a phase locked loop to bring an inverter voltage of an inverter being added to the system into phase alignment with the AC bus voltage prior to actually connecting the new inverter to the bus. Once phase matching is achieved, the isolator, (typically implemented by a relay), connects the inverter to the bus without significantly disrupting the voltage.

SUMMARY OF THE INVENTION

In accordance with an aspect of the invention, a control circuit is provided for use with a system for supplying power to a load via a bus. The system includes first and second inverters which are connected in parallel and which operate at substantially the same frequency. The control circuit is associated with the first inverter and is adapted for reducing cross conduction current between the first and second inverters. It includes a phase detector for developing a difference signal proportional to a difference between an input signal representative of an output current of the first inverter and a reference signal. The control circuit also includes a filter cooperating with the phase detector for smoothing and sampling the difference signal, and a signal generating circuit for adjusting the phase of an output voltage of the first inverter. The phase of the output voltage is dependent upon the difference signal. The signal generating circuit also develops the reference signal. The reference signal is substantially representative of the output voltage of the first inverter but is approximately 90 degrees out of phase with the output voltage. The phase detector, the filter, and the signal generating circuit cooperate to match the phase of the output voltage of the first inverter to the phase of the output voltage of the second inverter to thereby reduce cross conduction current flowing between the first and second inverters.

In some embodiments, the control circuit also includes a controlled switch coupled to the phase detector for delivering the input signal thereto. In such embodiments, the controlled switch preferably has a first state wherein the input signal delivered to the phase detector is representative of the bus voltage, and a second state wherein the input signal delivered to the phase detector is representative of the output current developed by the first inverter. When the controlled switch is in the second state, the phase detector, the filter and the signal generating circuit cooperate to reduce cross conduction current flowing between the first and second inverters. When the controlled switch is in the first state, the phase detector, the filter, and the signal generating circuit cooperate to match the phase of the output voltage of the first inverter to the phase of the bus voltage prior to connection to the bus.

In some embodiments, the phase detector comprises a multiplier, and/or the filter comprises a resettable integrator for developing an average difference signal over a first predetermined time period.

In some embodiments, the signal generating circuit comprises a voltage controlled oscillator for developing a phase correcting signal and the reference signal. In some such embodiments, the control circuit also includes an isolator in communication with the signal generating circuit for selectively preventing the output voltage of the first inverter from reaching the bus until the bus voltage and the output voltage of the first inverter are substantially in phase. In some such embodiments, the voltage controlled oscillator comprises a microcontroller coupled to the isolator, and the microcontroller controls the isolator to connect the output voltage of the first inverter to the bus when the average difference signal remains substantially constant for a second predetermined time period.

In the preferred embodiments, the control circuit also includes means for matching the amplitude of the output voltage of the first inverter and an amplitude of an output voltage of the second inverter. The matching means may optionally comprise a first current sense resistor coupled to the first inverter to cause a decrease in the output voltage of the first inverter in response to an increase in load current, and/or a second current sense resistor coupled to the second inverter to cause a decrease in the output voltage of the second inverter in response to an increase in the load current.

In accordance with another aspect of the invention, a system is provided for supplying power to a load via a bus. The system comprises a first inverter coupled to the bus and developing a first output voltage and a first output current; a second inverter coupled to the bus in parallel with the first inverter; and a control circuit associated with the first inverter. The control circuit includes a phase detector to detect a phase difference between the first output current and the first output voltage. It also includes a controlled oscillator adjusting the phase of the first output voltage. The phase detector is disposed in a phase locked loop with the controlled oscillator to reduce the detected phase difference to thereby reduce a quadrature current flowing between the first and second inverters.

In some embodiments, the system also includes a second control circuit associated with the second inverter. The second control circuit includes: (1) a second phase detector to detect a phase difference between a second output current associated with the second inverter and a second output voltage associated with the second inverter, and (2) a second controlled oscillator adjusting the phase of the second output voltage. The second phase detector is disposed in a second phase locked loop with the second controlled oscillator to reduce the detected phase difference to thereby reduce the quadrature current flowing between the first and second inverters. In some such embodiments, the system also includes means for matching the amplitude of the output voltage of the first inverter and the amplitude of an output voltage of the second inverter.

In accordance with another aspect of the invention, a control circuit is provided for use with a system including first and second inverters which are connected in parallel and operate at substantially the same frequency. The control circuit comprises a controlled switch having a first state and a second state; and a phase locked loop having an input coupled to the controlled switch. When the controlled switch is in the first state, the phase locked loop compares a signal representative of the bus voltage to a reference signal derived from an output voltage of the first inverter to drive the output voltage of the inverter into phase with the bus voltage, and, when the controlled switch is in the second state, the phase locked loop reduces a cross conduction current flowing between the first and second inverters.

In some embodiments, the cross conduction current has a quadrature component and the phase locked loop reduces the quadrature component of the cross conduction current.

In accordance with another aspect of the invention, a method of reducing cross conduction current flowing between at least two parallel inverters in a redundant power supply is provided. The method comprises the steps of: providing a reference signal which is approximately 90 degrees out of phase with the output voltage of a first one of the inverters; providing an input signal representative of an output current of the first inverter; multiplying the input signal and the reference signal to develop a difference signal; filtering and sampling the difference signal; and adjusting the phase of the output voltage of the first inverter and the reference signal to reduce the difference signal whereby cross conduction current flowing between at least two parallel inverters is reduced.

In some embodiments, the method also includes the step of integrating the difference signal over a predetermined time period. In some such embodiments, the step of filtering and sampling the difference signal is performed by periodically sampling and filtering the integrated difference signal.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
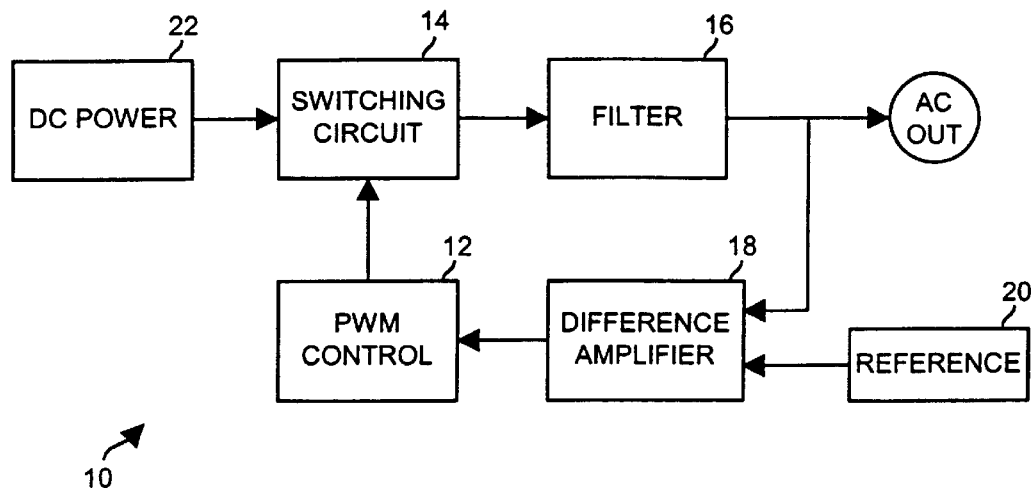
FIG. 1 is a block diagram illustration of a prior art inverter.

A prior art inverter 10 for use in a parallel redundant AC power supply is schematically illustrated in FIG. 1. As is conventional, the inverter 10 includes a pulse width modulation (PWM) control circuit 12, a switching circuit 14, a low pass filter 16 and a feedback loop implemented by a difference amplifier 18 having one of its inputs connected to a source 20 supplying a reference signal. As is well known in the art, the switching circuit 14 is coupled to a DC power supply 22 such as a battery plant. The PWM control circuit 12 drives the switching circuit 14 through various levels of conduction to generate an alternating current signal. The alternating current signal is passed through the low pass filter 16 to reduce undesirable noise and then output to a bus as an AC voltage. The frequency and amplitude of the AC voltage developed by the inverter is controlled via the feedback loop. In particular, the difference amplifier 18 compares the AC output voltage to a reference signal 20 to develop an error signal. The PWM control circuit 12 responds to the error signal by adjusting its duty cycle to reduce the difference between the reference signal and the AC voltage signal.

Practically all modern inverters employ a high frequency pulse width modulator 12 followed by a low pass filter 16 as discussed above. PID (proportional-integral-derivative) controllers that utilize current mode or derivative feedback can achieve high bandwidth control of the output sine wave developed by such inverters. Bandwidths of 5 KHz or more are common for a 60 Hz inverter. This sub-cycle control minimizes voltage distortion in the presence of non-linear loads.

Figure 2:
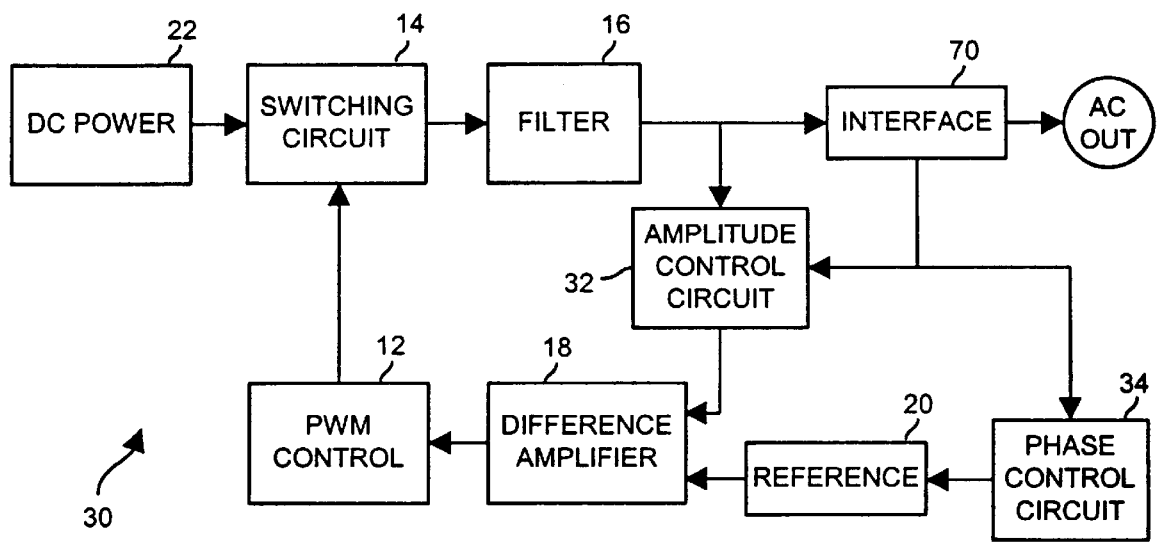
FIG. 2 is a block diagram illustration of an inverter constructed in accordance with the teachings of the invention.

An inverter 30 constructed in accordance with the teachings of the invention is schematically illustrated in FIG. 2. Like the prior art inverter 10 discussed above, the inverter 30 includes a PWM control circuit 12, a switching circuit 14 coupled to a DC power supply 22, a low pass filter 16 and a feedback loop including a difference amplifier 18 and a reference signal source 20. However, unlike the prior art, the inverter 30 illustrated in FIG. 2 has been modified to match the amplitude and phase of its output voltage to the amplitude and phase of other inverters (not shown) connected in parallel with the inverter 30 without employing common control circuitry or common control signals. In particular, the inverter 30 has been provided with an amplitude control circuit 32 and a phase control circuit 34 which together ensure proper load sharing between inverters connected in parallel in an AC power supply and, thus reduce cross conduction current circulating between the parallel inverters.

Figure 3:
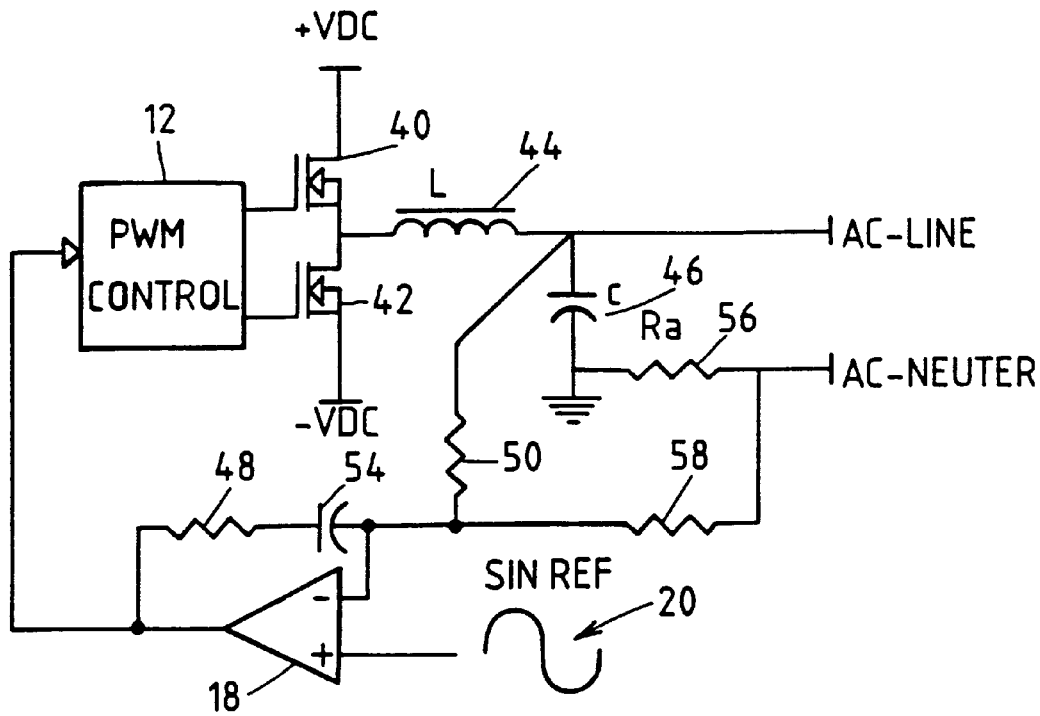
FIG. 3 is an illustration of a preferred implementation of a part of the circuit of FIG. 2.

A preferred implementation of the front end of the inverter 30 is shown in FIG. 3. As shown in FIG. 3, the switching circuit 14 is implemented by two field effect transistors 40, 42 coupled across a DC power supply 22 (+VDC, -VDC). The low pass filter 16 is implemented by an inductor 44 and a capacitor 46, as is conventional. The PWM control circuit 12, the reference signal source 20, as well as the difference amplifier 18 and its biasing circuitry (resistors 48, 50 and capacitor 54) are all conventional, well known structures which will not be described in further detail here.

As mentioned above, for the purpose of creating a controlled slope or regulation in the output voltage of the inverter 30, the inverter 30 is provided with amplitude matching means. The amplitude matching means effectively matches the amplitude of the output voltage of the inverter 30 to the amplitude(s) of the output voltage(s) of one or more inverters coupled in parallel with the inverter 30. In the illustrated embodiment, the amplitude matching means is implemented by a current sense resistor 56. As shown in FIG. 3, the current sense resistor 56 is coupled to the difference amplifier 18 via biasing resistor 58.

The current sense resistor 56 senses the load current supplied by the inverter 30. The current sensed by the resistor 56 is coupled to the resistor divider forming an input to the difference amplifier 18 as a load current signal. The addition of this load current signal into the feedback loop has the effect of causing the output voltage of the inverter 30 to decrease as the load current increases. As will be appreciated by persons of ordinary skill in the art, the presence of the current sense resistor 56 causes the inverter 30 to act as if a large resistor was in series with the inverter output. In other words, it creates an effective output resistance.

As will be appreciated by persons of ordinary skill in the art, in order for the addition of the effective output resistance to achieve amplitude matching between parallel inverters, each of the parallel inverters must include such an effective output resistance. In particular, all of the parallel inverters should be adjusted to the same voltage at the same load (e.g., 120 VAC at no load), and each parallel inverter is preferably provided with its own, independently operating amplitude control circuit 32. It is presently believed that selecting the output resistance to create a 5% droop from no load to rated load is acceptable. Such a droop should be easily tolerated by normal AC loads.

Persons of ordinary skill in the art will further appreciate that, although in the presently preferred embodiment, the amplitude matching means is implemented by current sense resistor 56, other amplitude matching elements may be employed in this role without departing from the scope or spirit of the invention. For example, a closed loop amplitude control circuit could be employed. Such a technique is, however, not presently preferred due to its inherently more complex nature and the potential for conflict with the phase matching circuit 34. Persons of ordinary skill in the art will further appreciate that effective resistances can be created to achieve the droop function described above in many ways without departing from the scope or spirit of the invention.

Figure 4:
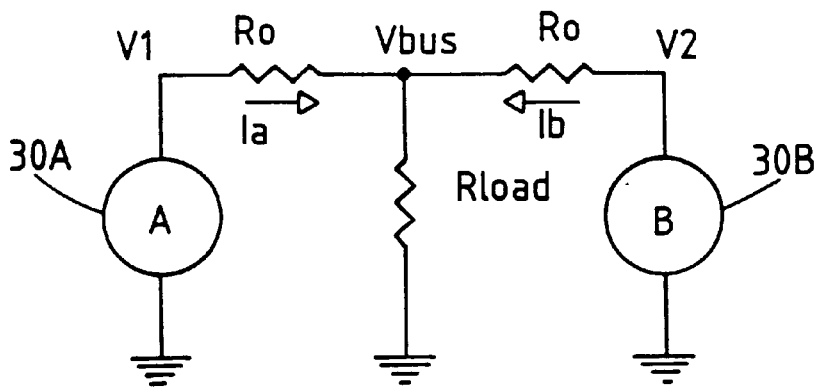
FIG. 4 is a schematic illustration of a simple redundant AC power supply employing wireless amplitude correction in accordance with the teachings of the invention.

A model of a simple, two inverter AC power supply is shown in FIG. 4. As shown in that figure, each of the two inverters 30A, 30B is constructed to include the circuitry shown in FIG. 3. Thus, each includes an effective output resistance Ro. Each of the inverters 30A, 30B is connected to a common AC bus by which they supply a load (shown here, for simplicity, as a resistive load). The inverters 30A, 30B are connected in parallel, operate at the same frequency, and have an open circuit output voltage V1, V2 and an output current Ia, Ib to the load. For purposes of explanation, the inverters can be thought of as sine wave voltage sources running at 60 Hz.

Figure 5:
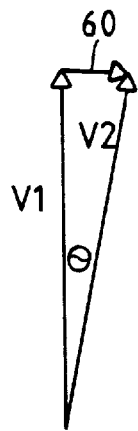
FIG. 5 is a vector diagram illustrating the output voltage of two parallel inverters sharing the same amplitude but different phases.

The relationship of the amplitude and phase of the output voltages of the inverters 30A, 30B will now be explained in connection with the vector diagrams shown in FIGS. 5 and 6. FIG. 5 illustrates the circumstance where only a phase error exists between the output voltages V1, V2. As shown in FIG. 5, when such a phase error is present, a cross conduction current proportional to the short connecting vector 60 circulates between the two inverters 30A, 30B. This cross conduction current serves no useful purpose and degrades the efficiency and capacity of the power supply system. Thus, it is undesirable. For small phase differences (represented by the angle theta), the cross conduction current is phase shifted by approximately 90 degrees from the inverter output voltages V1, V2. The cross conduction current is 90 degrees leading for one inverter (e.g., 30A), and 90 degrees lagging for the other inverter (e.g., 30B).

Figure 6:
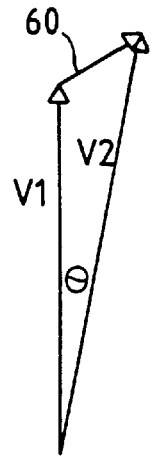
FIG. 6 is a vector diagram similar to FIG. 5, but showing output voltages having different phases and different amplitudes.

FIG. 6 illustrates the circumstance where the output voltages V1, V2 of the inverters 30A, 30B, are mismatched in both phase and amplitude. As shown in FIG. 6, the current vector 60 is no longer disposed at 90 degrees to the output voltages V1, V2. However, the current vector 60 can be resolved into an in-phase component (resistive) and an out-of-phase component (quadrature). The resistive component may be thought of as being caused by the amplitude difference in the output voltages. The quadrature component may be thought of as being caused by the phase difference.

The resistive current component represents power flow out of one inverter (e.g., 30A) and into the other inverter (e.g., 30B). When no load is present, this power flow can cause the DC rail voltage of the receiving inverter to be pumped up to dangerous levels. Thus, in addition to the amplitude control circuit 32 discussed above, in the preferred embodiment each of the parallel inverters 30A, 30B is provided with a voltage detector on its DC rail. Each of these voltage detectors serve to increase the amplitude of its associated inverter output voltage if the rail voltage starts to rise above normal levels. Only a small amount of control is needed to overcome tolerances and drift in the no-load voltage set points. Thus, the droop function provided by the amplitude control circuits 32 of the individual inverters and the DC rail protection circuitry reconcile amplitude errors between the parallel inverters as needed.

Persons of ordinary skill in the art will appreciate that the foregoing discussion did not consider the effects of load current, but instead focused only upon the cross conduction current. The presence of resistive load current does not change the above observations. Non-unity power factors and non-linear loads are discussed below.

Figure 7:
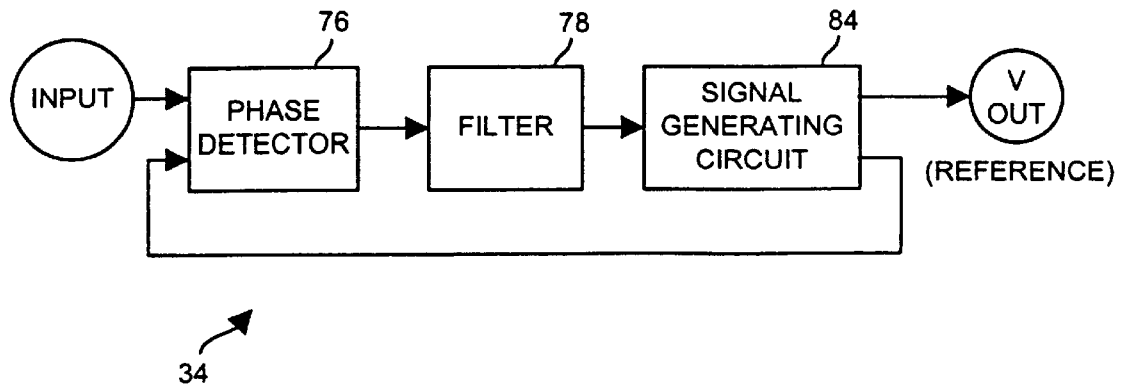
FIG. 7 is a block diagram of a phase control circuit constructed in accordance with the teachings of the invention.

As mentioned above, for the purpose of correcting phase errors between parallel inverters 30 in a power supply, each such parallel inverter 30 is provided with an independently operating phase control circuit 34. A more detailed view of the phase control circuit 34 is shown in FIG. 7. However, before reaching that discussion, a few comments about the circuit of FIG. 2 are in order.

Specifically, as shown in FIG. 2, the inverter 30 is provided with interface electronics 70 between the filter 16 and the AC output. The interface electronics 70 serve to measure and develop signals representative of the output current of the inverter 30 as output by the filter 16. As explained below, the phase control circuit 34 employs this representative current signal to develop a phase correction signal. This phase correction signal is used to adjust the phase of the AC power signal as directed by the reference circuit 20. As will be appreciated by persons of ordinary skill in the art, both the interface electronics 70 and the control circuit 34 can be implemented in many ways without departing from the scope or spirit of the invention. However, in the present embodiment, the interface electronics 70 are implemented by a current sense resistor and amplifier to develop a signal representative of the inverter output current but usable by the phase control circuit 34.

Figure 9:
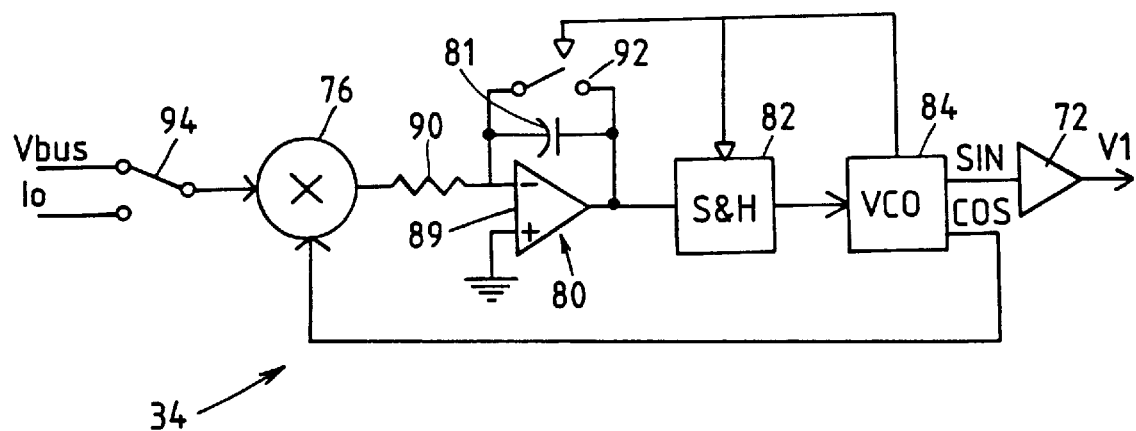
FIG. 9 is an illustration of a preferred implementation of the phase control circuit of FIGS. 7–8.

Returning to FIG. 7, for the purpose of developing a difference signal which is proportional to a difference between an input signal representative of the inverter output current and a reference signal, the control circuit 34 is provided with a phase detector 76. As will be appreciated by persons of ordinary skill in the art, the phase detector 76 can be implemented in many ways without departing from the scope or spirit of the invention. However, in the preferred embodiment, it is implemented by an analog multiplier 76 as shown in FIG. 9.

Figure 8:
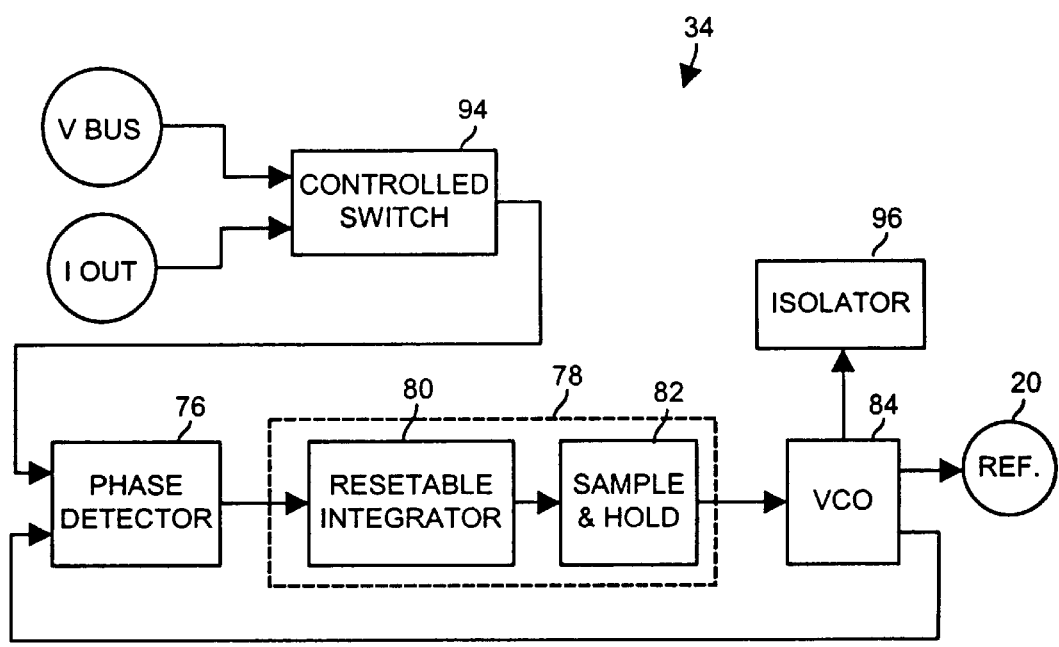
FIG. 8 is a more detailed block diagram of the phase control circuit of FIG. 7 with optional initial phase matching circuitry added.

In order to smooth the output of the phase detector 76, the phase control circuit 34 is further provided with a filter 78 (FIG. 7). Although persons of ordinary skill in the art will readily appreciate that the filter 78 can be implemented in many ways without departing from the scope or spirit of the invention, in the preferred embodiment the filter 78 is implemented by a resettable integrator 80 and a sample and hold circuit 82 as shown in FIG. 8. The resettable integrator 80 and the sample and hold circuit 82 cooperate to develop an average difference signal over a predefined time period.

Returning to FIG. 7, for the purpose of developing a phase correction signal to adjust the phase of the output voltage of the inverter 30, the phase control circuit 34 is provided with a signal generating circuit 84. As shown in FIG. 7, the reference signal used by the phase detector 76 is developed by the signal generating circuit 84. Significantly, the reference signal is preferably 90 degrees out of phase with the output voltage of the inverter 30. For resistive loads, the output current of the inverter 30 will be in phase with the output voltage, thus the output current will be 90 degrees out of phase with the reference signal to the phase detector 76. In such circumstances, the difference signal developed by the phase detector will be zero. When, however, the inverter current is not in phase with the inverter voltage, a cross conduction current will be present. In such circumstances, the phase detector 76 will detect a phase difference (i.e., the difference signal will be non-zero), and the phase locked loop formed by the detector 76, the filter 78 and the signal generating circuit 84 will act to remove the phase error thereby reducing or eliminating the cross conduction current.

As shown in FIGS. 2 and 7, when a phase error is detected the signal generating circuit 84 generates phase corrected references which are employed to adjust the phase of the inverter output voltage. As shown in FIG. 8, the signal generating circuit is preferably implemented by a voltage controlled oscillator 84 which develops the phase correcting signal for the inverter ("Reference" in FIG. 2) and the reference signal used by the phase detector 16. The phase correcting signal is preferably proportional to the output voltage waveform and is, thus, 90 degrees out of phase with the reference signal. Although persons of ordinary skill in the art will readily appreciate that the signal generating circuit 84 can be implemented in many ways without departing from the scope or spirit of the invention, in the preferred embodiment the signal generating circuit (i.e., the VCO) 84 is implemented by a microcontroller sold under the tradename PIC16C74 by Microchip. A detailed description of the preferred implementation of the VCO 84 is provided below.

A circuit illustrating one possible implementation of the phase control circuit 34 is shown in FIG. 9. As shown in FIG. 9, the phase detector 76 is preferably implemented by an analog multiplier. The output of the multiplier 76 is coupled to the resettable integrator 80 which comprises amplifier 89, resistor 90, capacitor 81 and reset switch 92. A shunting switch 92 is connected across the capacitor 82 for periodically shorting the capacitor 82 to thereby reset the integrator 80. For an inverter 30 running at 50 Hz, the integrator 80 is preferably reset every 10 milliseconds. For an inverter running at 60 Hz, the integrator 80 is preferably reset every 8.33 milliseconds.

The output of the sample and hold circuit 82 constitutes the input signal to the signal generating circuit 84. As mentioned above, the signal generating circuit is implemented by a microcontroller acting as a digital VCO that is described in detail below. Preferably, the sample and hold circuit 82 is also implemented by that same microcontroller. As shown in FIG. 9, the microcontroller is coupled to the shunting switch 92 and the sample and hold circuit. It controls the switch 92, which is preferably implemented by a transistor, to periodically reset the integrator 80 just after a sample is taken. One output of the VCO 84 (shown in FIG. 9 as a sine wave) constitutes the inverter reference signal 20 discussed above. This phase correction signal is amplified by the inverter power train to create the output voltage of the inverter 30. The second output of the VCO 84, (shown in FIG. 9 as a cosine wave) is the reference signal which is fed back to the multiplier 76.

The embodiments shown in FIGS. 8 and 9 are provided with a controlled switch 94 at their inputs. Although not shown in FIG. 9, these embodiments also include an isolator 96 which functions when adding the inverter to a hot bus to prevent the output voltage of the inverter 30 from reaching the load bus until the output voltage of the inverter 30 is substantially in phase with the bus voltage. More specifically, assuming for the moment that one or more parallel inverters are already supplying voltage to the bus and the inverter 30 is now to be plugged into a shelf in the supply, the isolator 96, (preferably implemented as a relay), is set to a state wherein the output voltage of the inverter 30 cannot reach the bus. The isolator 96 is coupled to the microcontroller 84, which controls its state to connect the inverter 30 to the bus after phase alignment has occurred.

The microcontroller 84 is also coupled to the input switch 94, which is preferably implemented by an analog multiplexor. As shown in FIGS. 8 and 9, the input switch 94 has two states. In one state, the switch 94 connects an input signal which is representative of, (and preferably proportional to), the bus voltage (see FIG. 4) to the multiplier 76. In its second state, the input switch 94 connects an input signal which is representative of, (and preferably proportional to), the output current developed by the inverter 30 to the multiplier 76. In the start-up phase, the microcontroller 84 controls the switch 94 such that the input signal representative of the bus voltage is delivered to the phase detector 76.

The average value of the product of the bus voltage and the cosine wave output by the VCO 84 will be zero when those two signals are exactly 90 degrees apart; which occurs exactly when the output voltage of the inverter 30 is in phase with the bus voltage. The phase locked loop (i.e., the multiplier 76, the filter 78, and the VCO 84) drives the outputs of the VCO 84 to achieve this null. The microcontroller 84 determines that phase lock has occurred (i.e., the phase of the output voltage of the inverter 30 substantially matches the phase of the bus voltage) when the sampled error signal (Vc in FIG. 9) is steady for a predetermined number of cycles. When phase lock occurs, the microcontroller 84 closes the relay forming the isolator 96 to connect the inverter 30 to the bus. It also changes the state of the input switch 94 such that the input signal delivered to the multiplier 76 is now representative of the output current of the inverter 30.

If the output current of the inverter 30 is in phase with the output voltage of the inverter 30, the output of the multiplier 76 will be zero, and no phase correction will be required or will occur. If, on the other hand, a cross conduction current with a quadrature component is present, the multiplier 76 will generate a difference signal which will result in an adjustment in the phase of the output voltage of the inverter 30. The quadrature component of the cross conduction current will, thus, be reduced and preferably eliminated.

If the load has reactive currents, the phase control circuits 34 of the parallel inverters 30 will adjust the phase of the output voltages of their respective inverters to minimize the quadrature cross currents, but an error voltage out of the multiplier/integrator will remain. As a result, all of the inverters 30 will run at the same frequency offset.

Non-linear load currents are ignored by the phase control circuit unless they generate a quadrature current component. If so, the inverters 30 will be driven to act as they do in the presence of reactive currents, namely, at a frequency offset which is the same for all inverters.

Figure 10:
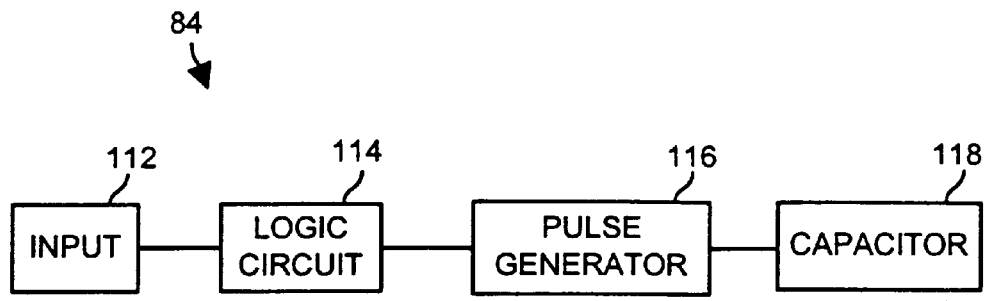
FIG. 10 is a schematic illustration of a digital voltage controlled oscillator for use in the inverter of FIG. 2.

A digital voltage controlled oscillator (DVCO) 84 is shown generally in FIG. 10. As explained in detail below, the disclosed DVCO 84 produces an oscillating output signal having a frequency which is dependent on a voltage input signal received at an input 112. The oscillating output signal can have virtually any waveform, including, by way of examples, not limitations, sinusoidal waveforms such as sine and cosine waveforms, trapezoidal waveforms and sawtooth waveforms without departing from the scope or spirit of the invention. As also explained in detail below, the disclosed DVCO 84 is implemented by a microcontroller executing programmed steps. However, persons of ordinary skill in the art will readily appreciate that the DVCO 84 can be implemented by firmware or software executing on a microprocessor or microcontroller and/or by hardwired logic circuit(s) without departing from the scope or spirit of the invention.

As mentioned above, the DVCO 84 includes an input 112 for receiving input signals representative of a desired frequency. The DVCO 84 also includes a logic circuit 114, a pulse generator 116, and a capacitor 118 (see FIG. 10). As its name suggests, the pulse generator 116 is adapted to output electrical pulses which are used to charge the capacitor 118. The logic circuit 114, which is in communication with the input 112 and the pulse generator 116, is adapted to control the pulse generator 116 to define the amount of energy contained in the pulses delivered to the capacitor 118. In particular, the logic circuit 114 is adapted to vary the output pulses of the pulse generator 116 to produce a voltage at the capacitor 118 that is representative of an oscillating signal having a predefined waveform and having the frequency specified by the signals received at the input 112.

Figure 11:
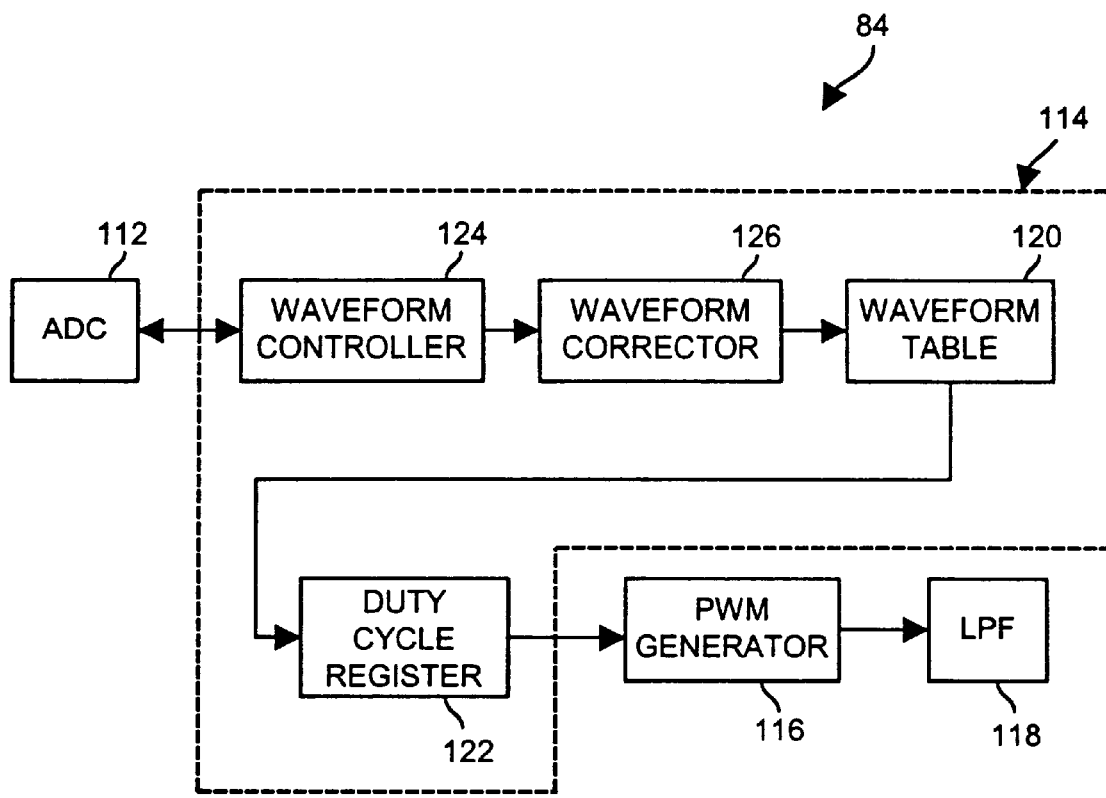
FIG. 11 is a more detailed view of the DVCO of FIG. 10.

A more detailed view of the DVCO 84 is shown in FIG. 11. As shown in that figure, the input 112 is preferably implemented by an analog to digital converter; the pulse generator 116 is preferably implemented by a pulse width modulated pulse generator (PWM generator); and the capacitor 118 is preferably part of a conventional low pass filter including a resistor.

The logic circuit 114 controls the amount of energy delivered to the low pass filter 118 at any given time by controlling the duty cycles of the pulses output by the PWM generator 116. The duty cycles can preferably vary between 0 and 100% as a function of the desired output waveform. To this end, the logic circuit 114 includes a waveform table 120 which stores a plurality of duty cycle values. These values are calculated by dividing one cycle of the desired waveform (e.g., a sine wave) into a plurality of intervals. In the preferred embodiment, the waveform is split into seventy-two intervals with one pulse of the PWM generator 116 occurring in each interval. (Persons of ordinary skill in the art will appreciate, however, that a different number of intervals can be used if desired.) The amount of energy needed to produce a voltage on the capacitor 118 that varies with the desired waveform is then calculated for each of the seventy-two intervals. These calculations are converted into seventy-two duty cycle values which are stored in the waveform table 20.

By way of a more concrete example, assuming the desired waveform is a sine wave and seventy-two intervals have been selected, the maximum positive voltage on the capacitor should occur at 90° (i.e., the 18th interval). The energy delivered to the capacitor 118 during the 18th interval should be maximized relative to the other intervals. Therefore, the duty cycle of the pulse associated with the 18th interval could be selected as 1. Since a sine wave crosses zero at 180° and 360° (i.e., the 36th and 72nd interval), the duty cycles of the pulses generated in the 36th and 72nd interval should be 0.5 and zero at 270°. Appropriate duty cycles for the remaining points should vary as a function of the desired waveform (e.g., sin(x)), and can be calculated using well known mathematical techniques.

For the purpose of sequentially delivering the duty cycle values to the pulse width generator 116, the logic circuit 114 is provided with a duty cycle register 122. The duty cycle register 122 temporarily stores one of the duty cycle values from the waveform table 120. The duty cycle value in the register 122 is communicated to the PWM generator 116 each interval to define the positive going width (i.e., the duty cycle) of the pulse output to the capacitor 118 during that interval.

To control the rate at which the duty cycle values are written to the duty cycle register 122, the rate at which duty cycle values are provided to the PWM generator 116, and, thus, the rate at which pulses are output by the generator 116, the logic circuit 114 is further provided with a waveform controller 124. As shown in FIG. 11, the waveform controller 124, which is preferably implemented by firmware, is in communication with the ADC 112. The waveform controller 124, thus, periodically reads the digitized value output by the ADC 112 to determine if a new frequency is desired. If a new frequency is desired, the waveform controller 124 makes a proportional adjustment to the rate at which it causes the duty cycle values to be written from the waveform table 120 to the duty cycle register 122 and the rate at which the PWM generator 116 outputs pulses.

Although optional, in the preferred embodiment, the logic circuit 114 is also provided with a waveform corrector 126 which functions to correct frequency errors that would otherwise be induced at some frequencies by a strict seventy-two equal period approach. In particular, because the desired waveform period will not always divide evenly by seventy-two intervals, a certain amount of frequency error could result. To avoid such error, the waveform corrector 126 periodically varies the rate at which the duty cycle values are changed in the duty cycle register 122 and the rate at which the PWM generator creates pulses. Specifically, the waveform corrector 126 lengthens the duration of some of the seventy-two intervals to ensure the seventy-two intervals cover the entire period associated with the desired frequency. Preferably, the lengthened intervals are evenly distributed throughout the waveform cycle so as to minimize distortion of the waveform.

Figure 12:
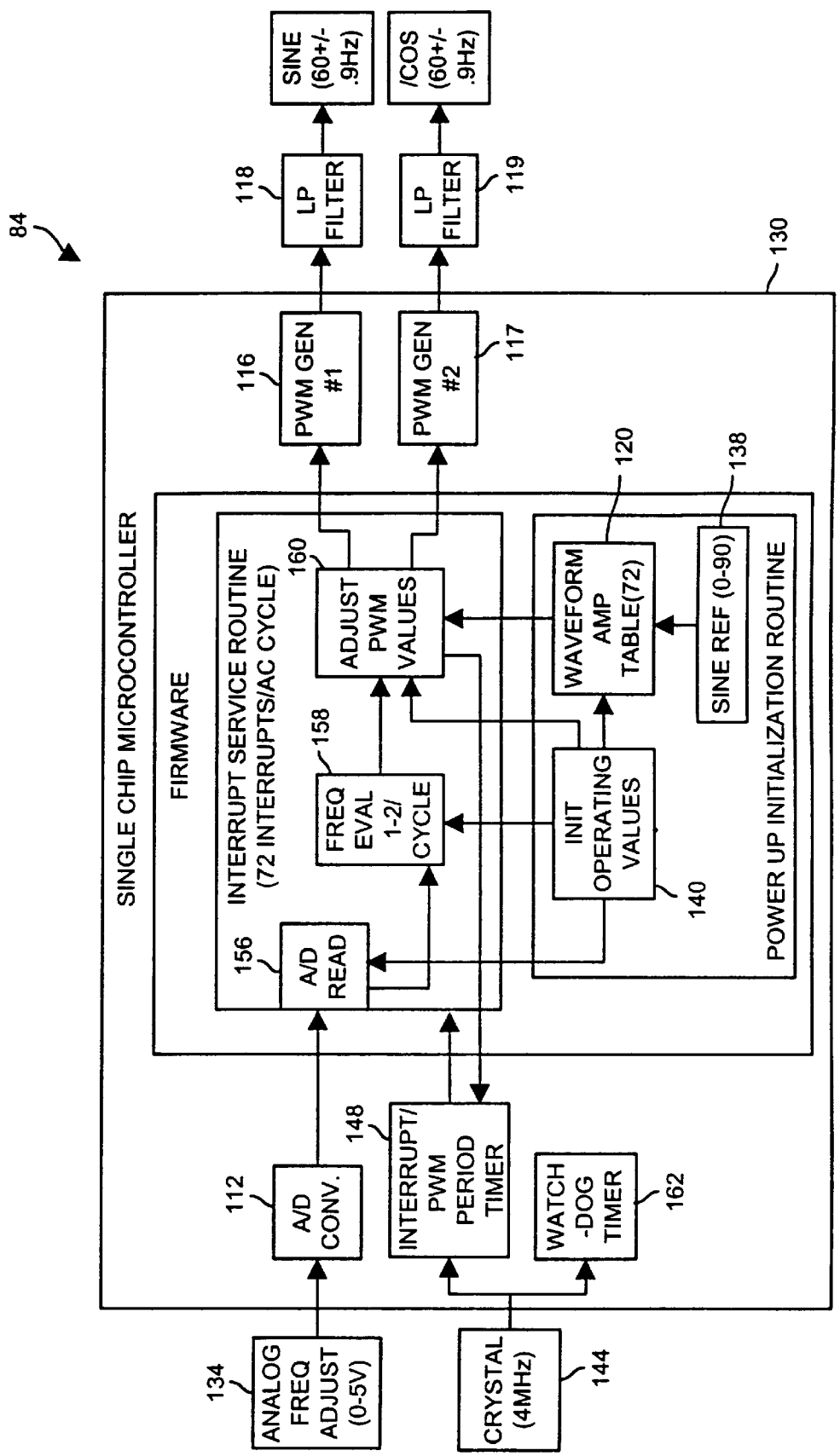
FIG. 12 is a block diagram illustrating a preferred implementation of the DVCO of FIG. 10.

A more detailed block diagram illustrating a preferred implementation of the disclosed DVCO 84 is shown in FIG. 12. As mentioned above, the DVCO 84 is preferably implemented on a microcontroller 130. As shown in FIG. 12, a microcontroller 130 such as the PIC16C74 sold by Microchip is presently preferred in this role because it includes an on-board ADC 112 and two on-board PWM generators 116, 117. However, persons of ordinary skill in the art will readily appreciate that other microcontrollers or microprocessors can be used in this role without departing from the scope or spirit of the invention.

As shown in FIG. 12, an analog frequency adjust circuit (implemented in the circuit of FIG. 9, by the sample and hold circuit 82) is preferably coupled to the ADC 112. The ADC 112 is preferably an 8 bit converter and is preferably configured to develop an 8 bit digital value from 0 to 255 in direct proportion to an analog voltage signal between 0 and 5 volts delivered by the frequency adjust circuit 134. Although in the preferred embodiment, the relationship between the analog input voltage and the digital output of the ADC 112 is linear, non-linear arrangements can be utilized, if desired, without departing from the scope or spirit of the invention.

For the purpose of developing the waveform table 120, the microcontroller 130 includes a reference table 138. Since in the illustrated embodiment, the DVCO 84 outputs two waveforms, namely, a cosine wave and a sine wave, the reference table 138 preferably includes duty cycle values for a sine wave. To save read only memory, duty cycle values are only stored for the first 90 degrees of the sine wave as the remaining duty cycle values (i.e., the values for 90° to 360°) can be easily calculated from the duty cycle values for the first ninety degrees. Preferably, each duty cycle value is represented by an unsigned thirty-two bit integer.

The waveform table 120 which contains duty cycle values for each of the seventy-two intervals of the waveform is ultimately created from the reference table 138. In particular, at start-up, the waveform table 120 is created in volatile memory (not shown) and the nineteen duty cycle values in the reference table 138 are used to populate the seventy-two duty cycle values of the waveform table 120 using well known mathematical formulas.

Although the illustrated DVCO 84 utilizes the reference table 138 as a means to conserve memory, persons of ordinary skill in the art will readily appreciate that it can be replaced with a complete waveform table 120 thereby eliminating the need for two tables 120, 138. Similarly, although in the illustrated DVCO 84, the complete waveform table 120 is populated at start-up, persons of ordinary skill in the art will readily appreciate that the duty cycle values can be calculated on the fly on an as-needed basis from the reference table 138 if desired. In other words, the waveform table 120 need not exist as a whole at any given time.

As shown in FIG. 12, the microcontroller 130 also stores a plurality of initial operating values 140 in read only memory (not shown). These operating values 140 defines such parameters as the limits on the frequency range (i.e., the minimum and maximum time between pulse intervals which, of course, define the maximum and minimum frequencies for the oscillating output signal(s)), resolution (i.e., the smallest possible difference between pulse intervals (e.g., f1−f2=resolution, where f1 and f2 are immediately adjacent frequencies), and a default PWM period value (i.e., the length of each of the seventy-two intervals in time) to be used at start-up until a replacement value is obtained via the ADC 112. In the preferred DVCO 84, the frequency range is approximately 59–61 Hz (frequencies outside of this range can be achieved by selecting alternate hardware components (e.g., a different crystal clock, a different microcontroller and/or a different capacitor), if desired), the control resolution is approximately 2 microseconds, and the default PWM period value is the smallest possible interval (16,412 microseconds). These initial values 140 may also define the initial relationship (e.g., linear) between the 0–5 volt analog input voltage and the 0–255 digital output value.

The length of the PWM periods (i.e., the durations of the seventy-two intervals) and the times at which interrupts occur are based upon the output signal of a crystal clock 144. As shown in FIG. 12, the crystal clock 144 preferably operates at 4 MHZ. To scale the frequency of the clock down to an appropriate level, the microcontroller 130 is provided with a timer prescaler 146 (see FIG. 4). The scaled clock signal is input to a counter 148 labeled an interrupt/PWM period timer in FIGS. 3 and 4. As shown in FIG. 4, the value in the interrupt/PWM period timer 148 is compared to a value stored in a PWM period/interval frequency setting register 150 by a comparator 152. The value in the PWM period register 150 is set by the microcontroller 130 as explained in detail below. In any event, whenever the value in the interrupt interval timer 148 matches the value in the PWM period register 150, the microcontroller 130 resets the interrupt interval timer 148 and initiates an interrupt service routine (described below). Since in the preferred implementation, each cycle of the output waveform is divided into seventy-two intervals, the interrupt service routine will be called seventy-two times a cycle (i.e., every five degrees).

As shown in FIG. 12, the interrupt service routine performs two basic functions. It determines whether the frequency of the oscillating output signal must change, and it adjusts the duty cycles of the pulses generated by the PWM generators 116, 117 in accordance with the values in the waveform table 120. To the former end, the microcontroller 130 is provided with A/D read firmware 156 and frequency evaluation firmware 158. The A/D read firmware 156 and the frequency evaluation firmware 158 cooperate to periodically read an ADC result register (not shown) associated with the ADC 112 to determine if a voltage requiring a change in the frequency of the output signal has been received. If so, the frequency evaluator firmware 158 is adapted to calculate a new PWM period value and to update the PWM period register 150 (see FIG. 4) with the updated value. As shown in FIG. 4, by changing the value in the PWM period register 150, the microcontroller 130 changes the rate at which interrupts occur. Since there are always seventy-two intervals per waveform cycle and the occurrence of an interrupt begins a new interval, increasing the rate at which interrupts occur increases the frequency of the oscillating output signal. Likewise, decreasing the rate at which interrupts occur, decreases the frequency of the oscillating output signal.

Although persons of ordinary skill in the art will readily appreciate that other approaches may be taken to frequency control, in the disclosed DVCO 84 frequency is evaluated two times a waveform cycle, namely, at twenty degrees before the positive going zero crossing point (interrupt interval 69) and at twenty degrees before the negative going zero crossing (i.e., interrupt interval 33).

The second function of the interrupt service routine is to adjust the duty cycles of the pulses generated by the PWM generators 116, 117 to produce the desired output waveforms at the outputs of the low pass filters 118, 119. This function is performed by the firmware 160 represented by the block labeled "Adjust PWM Values" in FIG. 12. Specifically, the firmware 160 causes the microcontroller 130 to respond to each interrupt by loading the next duty cycle value(s) from the waveform table 120 into respective ones of the PWM generators 116, 117. The adjust PWM values firmware 160 also causes the microcontroller 130 to periodically increase the value in the PWM period register 150 by a predetermined amount (preferably one microsecond) to cause an extended interval to occur. As explained above, such extended intervals are used to ensure the oscillating waveform has the desired frequency. As also explained above, these extended intervals are preferably evenly distributed throughout the cycle to minimize waveform distortion. To this end, the adjust PWM values firmware 160 also operates to return the value in the PWM period register 150 to its normal level until it again becomes time for an extended interval.

As shown in FIG. 12, the microcontroller 130 is preferably provided with a watchdog timer 162. The watchdog timer 162 functions to ensure each step is executed within the seventy-two interrupts. If an error occurs, it will reset the microcontroller 130.

Figure 14:
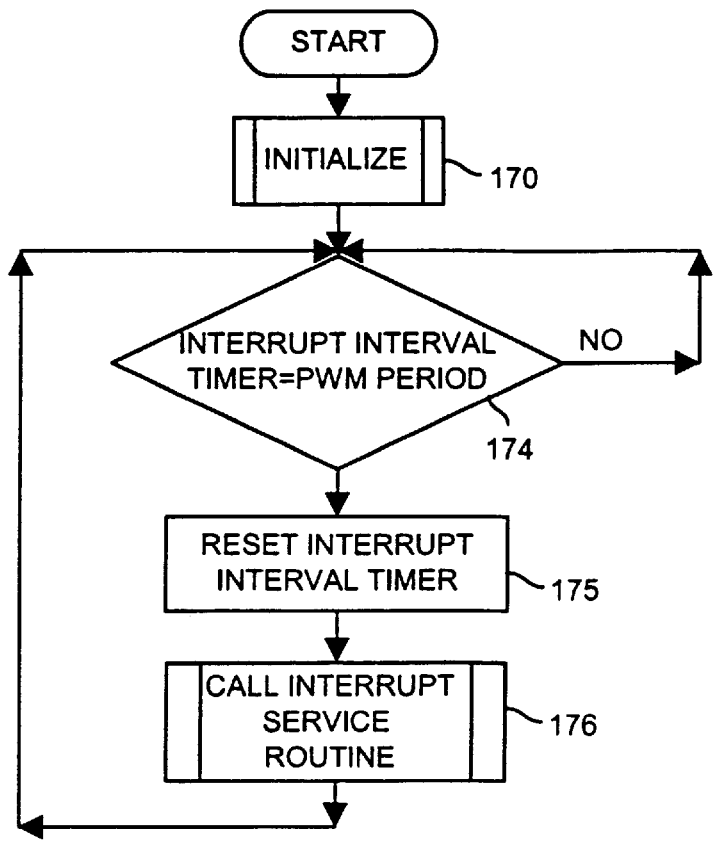
FIG. 14 is a flow chart illustrating a preferred program executed by the microcontroller of FIG. 12.
Figure 15:
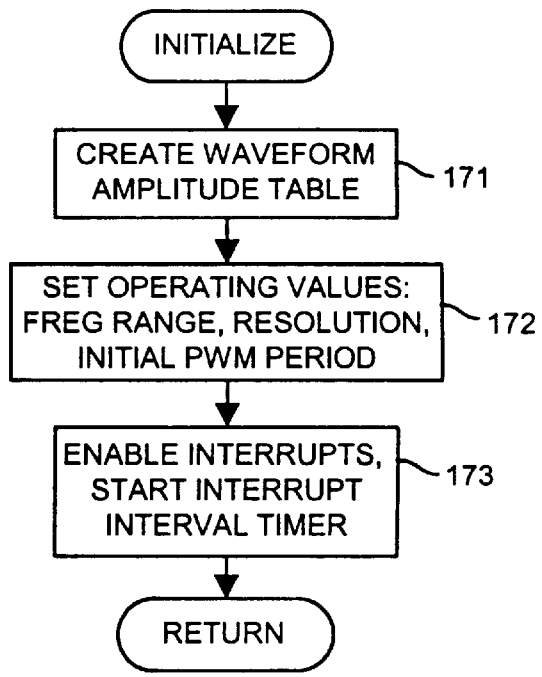
FIG. 15 is a flow chart illustrating the initialize routine called by the program of FIG. 14.

The operation of the disclosed DVCO 84 will now be explained in more detail in connection with the flowcharts illustrated in FIGS. 14–16. While the flowcharts of FIGS. 14–16 illustrate a preferred exemplary program for implementing the DVCO 84, persons of ordinary skill in the art will readily appreciate that many different approaches to implementing the programmed steps can be followed without departing from the scope or spirit of the invention. Further, although the flowcharts illustrate steps performed in a certain order, persons of ordinary skill in the art will appreciate that other temporal sequences may also be employed.

Turning to FIG. 14, at start-up, the microcontroller 130 calls the initialize routine block 170). As shown in FIG. 15, the initialize routine primarily addresses certain housekeeping tasks. For example, at block 171, the microcontroller 130 performs the calculations necessary to create the waveform table 120 from the reference table 138. As explained above, the values in the waveform table 120 are dependent upon the desired waveform. In the illustrated DVCO 84, the desired waveform is a sine wave and a cosine wave (see FIG. 12) which can both be developed from the same waveform table 120.

Figure 13:
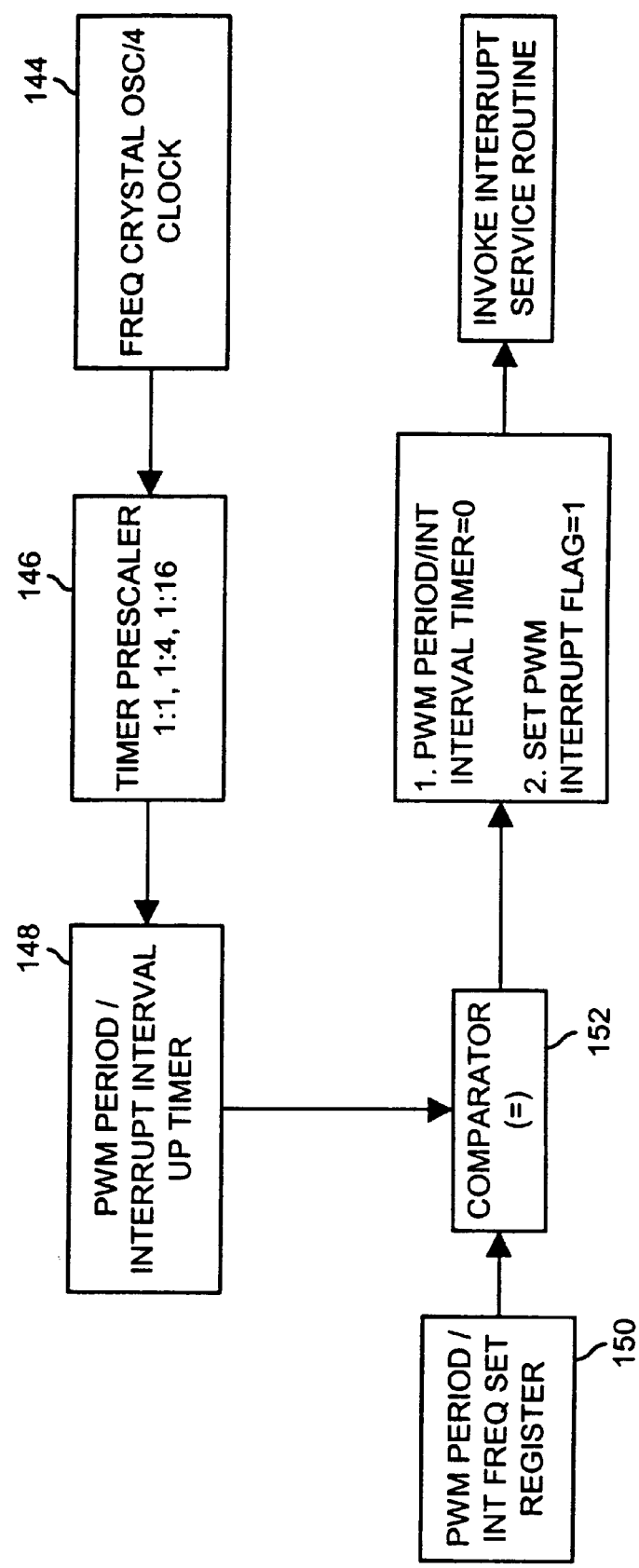
FIG. 13 is a block diagram representing the interrupt timing control of the DVCO of FIG. 12.

In any event, at block 172, the microcontroller 130 retrieves certain operating values from its on-board ROM. These values preferably include the frequency range values, the resolution value and the initial PWM period value explained above. The initial PWM period value is loaded into the PWM period register 150 (see FIG. 13) to ensure an interrupt occurs. Preferably, the initial PWM period value is the shortest possible period to ensure the interrupts occur at the fastest possible rate until the first frequency evaluation (i.e., ADC read) occurs and the frequency/PWM period is adjusted to the level specified by the input voltage.

In the disclosed DVCO 84, the shortest PWM period for the highest possible sine frequency is:

$$\text{INT}((\text{INT}((\frac{1}{60}\text{Hz})*1{,}000{,}000)-255\mu s)/72\text{steps})=227\mu s.$$

After the operating values are set, control proceeds to block 173. At block 173, the microcontroller 130 enables the interrupts and starts the interrupt interval timer 148. Control then returns to block 174 of the main routine (FIG. 14).

At block 174, the microcontroller 130 enters a loop wherein it waits until the comparator 152 indicates that the interrupt timer 148 has reached the value specified in the PWM period register 150. Once this occurs, a new PWM period begins, the interrupt interval timer 148 is reset to zero (block 175) and the interrupt service routine is called (block 176).

Figure 16A:
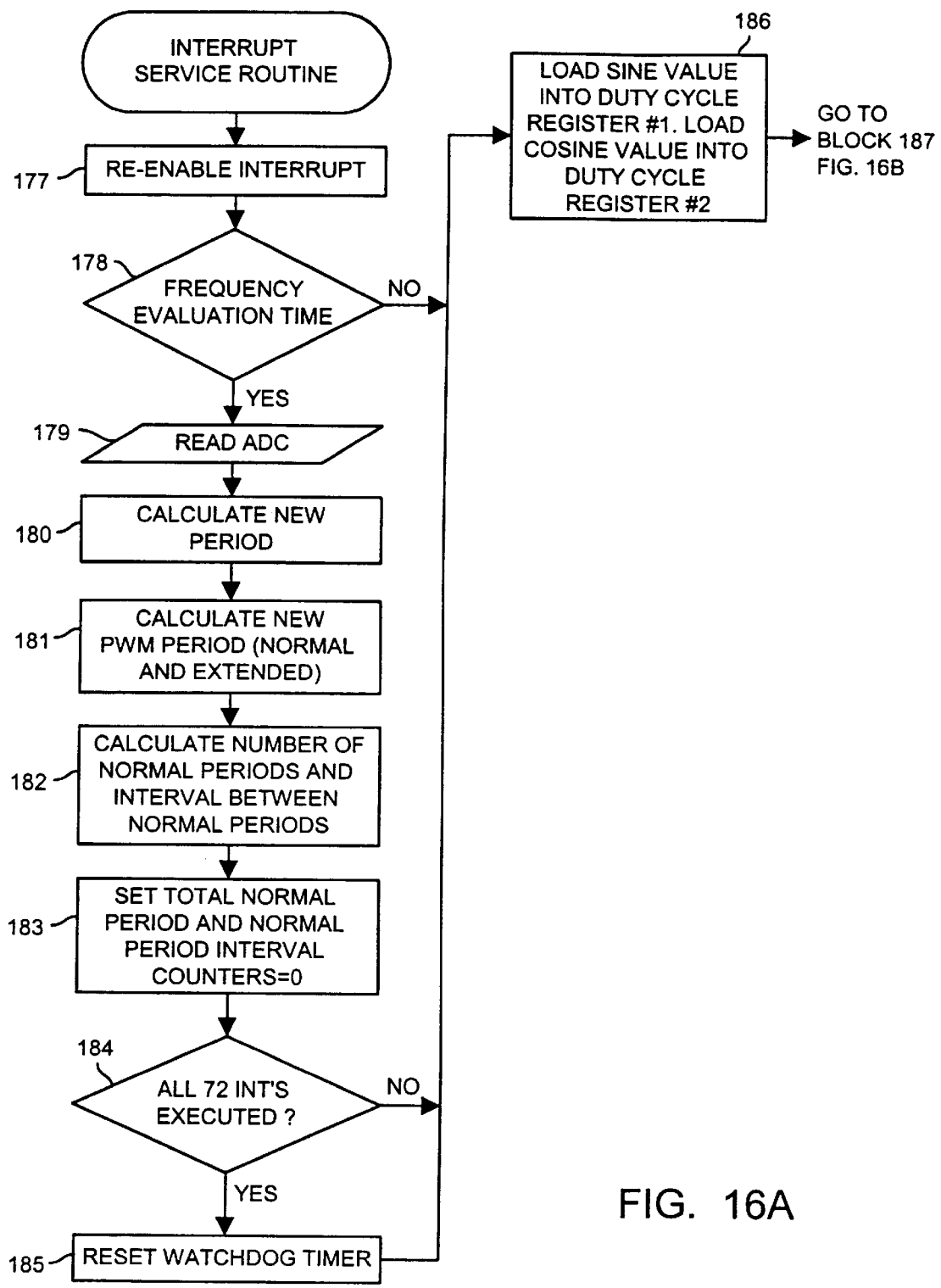
FIGS. 16A–16B is a flow chart illustrating the interrupt service routine called by the program of FIG. 14.
Figure 16B:
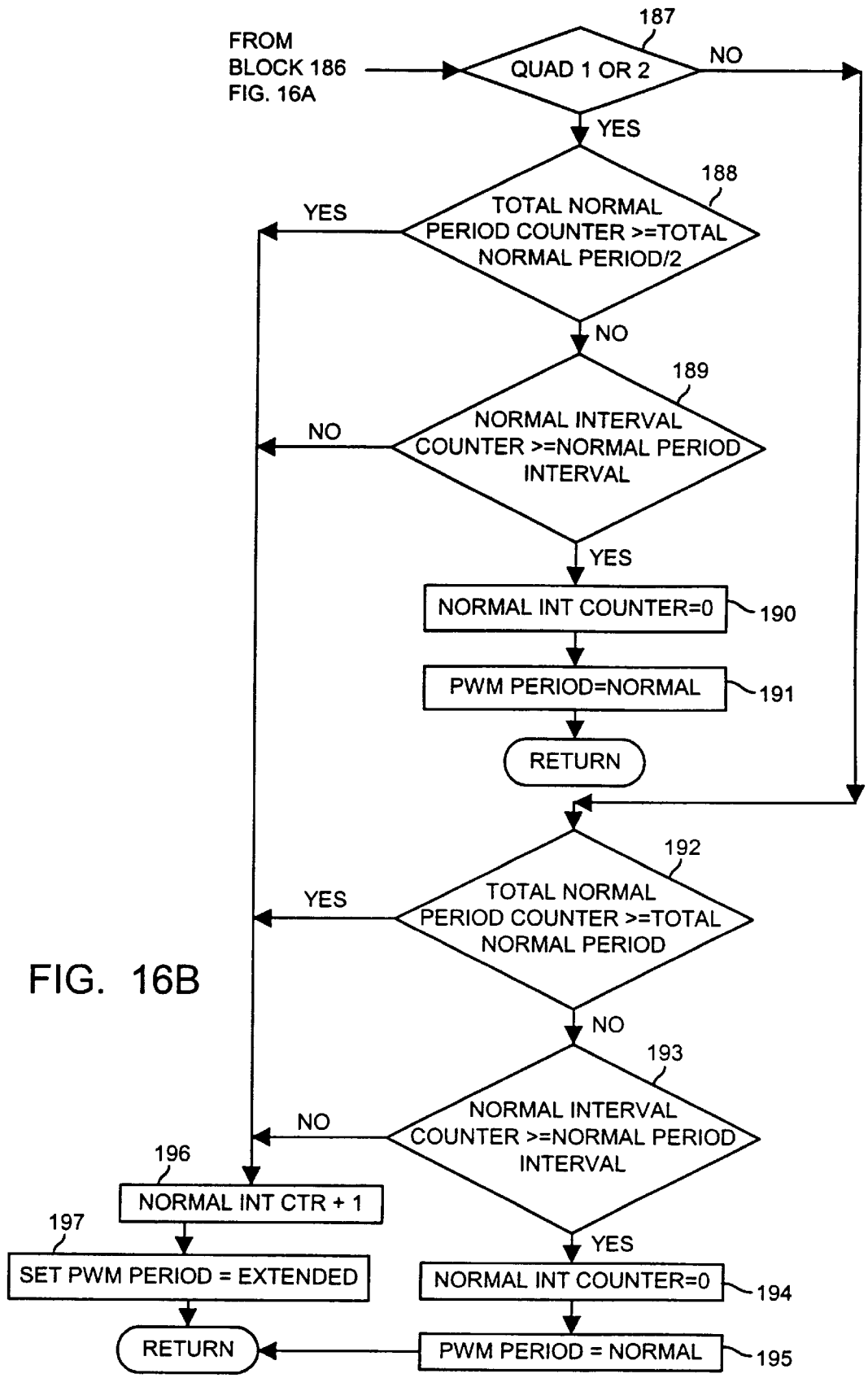

The interrupt service routine FIGS. 16A–16B begins by re-enabling the interrupt flag (FIG. 16A, block 177). The waveform controller 124 then determines whether it is time to check the ADC 112 for a new frequency (block 178). As mentioned above, in the disclosed DVCO 84, the frequency check (ADC read) occurs at 160 degrees and 340 degrees (i.e., at the 33rd interrupt and the 69th interrupt within a waveform cycle). However, additional checks, fewer checks and/or checks at different intervals can be performed if desired. If it is not time to evaluate the frequency, control proceeds to block 186. Otherwise, control proceeds to block 179.

Assuming for discussion purposes that a frequency evaluation time has arrived (block 178), the waveform controller 124 reads the ADC 112 (block 179). Once the output of the ADC 112 is obtained (e.g., a digital number between 0 and 255), the waveform controller 124 calculates a new PWM period (block 180). The new waveform period is calculated by the following equation:

New Waveform Period=16,667+(127−control result)* 2 μs where the control result is the output of the ADC 112 (i.e., a number between 0 and 255).

After the new waveform period is calculated (block 180), the waveform controller 124 calculates a new PWM period and a new extended PWM period (block 181). The new PWM period is calculated with the following equation:

PWM Period=INT (New Waveform Period/72).

The extended PWM period is calculated according to the following equation:

Extended PWM Period=PWM Period+1 μs.

Based upon the remainder resulting from the calculation of the PWM period (i.e., New Waveform Period/72), there will be a need to insert extended periods during the waveform to ensure the output waveform has the desired frequency. The extended periods should be substantially evenly distributed across all four quadrants of the waveform to minimize distortion of the output waveform. At block 182, the waveform controller 124 calculates the number of extended periods required during a cycle of the waveform via the following equation:

Number of Extended Periods=ABS (INT (New Waveform Period/72)−New Waveform Period/72)* 72.

The number of intervals between extended periods is also calculated at block 182 by the following equation:

Extended Period Interval=72/Number of Extended Periods.

Once these calculations are completed, the waveform controller 124 sets both a total PWM (normal) periods counter and a PWM (normal) period interval counter to zero (block 183).

At block 184, the microcontroller 130 determines whether all seventy-two interrupts have occurred. If so, the watchdog timer 162 is reset (block 185). Otherwise, control proceeds to block 186. As explained above, if the watchdog timer 162 is not reset within a predefined time period (i.e., all seventy-two interrupts are not executed within the predefined time period), the watchdog timer 162 will reset the microcontroller 130 and control will return to block 170 of the main routine (FIG. 14).

Regardless of whether control reaches block 186 from block 178, block 184 or block 185, the waveform controller 124 retrieves the duty cycle values associated with the current interval from the waveform table 120 and respectively loads them into the sine and cosine duty cycle registers 122 (block 186). As is well known, a cosine wave can be thought of as a sine wave shifted in time by 90 degrees. Therefore, the duty cycle value for the cosine duty cycle register can be identified and retrieved by adding eighteen to the current interval number in the total interval counter and accessing the waveform table 120 based on that calculation. The sine duty cycle value is retrieved by simply accessing the duty cycle value corresponding to the current interval number. When the duty cycle values are loaded into their respective registers 122, the PWM generators 116, 117 generate pulses having widths dictated by the values in their respective registers. Control then proceeds to block 187 (FIG. 16B).

At block 187, the waveform corrector 126 determines whether the current interval occurs in the first half cycle of the waveform (i.e., in quadrant 1 or 2). If not, control proceeds to block 192. Otherwise, control proceeds to block 188.

Assuming for the moment that the current interval is in the first half cycle, at block 188 the waveform corrector 126 determines whether half of the normal PWM periods to occur in the waveform cycle have already occurred. If so, control proceeds to block 196. Otherwise control proceeds to block 189. The check at block 188 is performed to ensure the total number of normal PWM periods are substantially evenly distributed between the first and second halves of the waveform cycle.

If the number of normal PWM periods assigned to the first half of the waveforn cycle have not been exceeded (block 188), the waveform corrector 126 then compares the value in the normal interval counter to the normal PWM interval variable to determine if it is time to insert a normal PWM period (block 189). This step is performed to ensure the normal PWM periods are evenly distributed throughout the waveform cycle.

If it is time for a normal PWM period, the waveform corrector 126 resets the normal interval counter (block 190) and sets the PWM period register 150 to the normal PWM period value (block 191). Control then returns to block 174 of FIG. 14 to await the occurrence of the next interval.

If it is not time for a normal PWM period (block 189), the waveform corrector 126 increments the normal interval counter (block 196) and sets the PWM period register 150 to the extended PWM period value (block 197). Control then returns to block 174 of FIG. 14.

If at block 187, the waveform corrector 126 determines that the current interval occurs in the second half of the waveform cycle, control proceeds to block 192. At block 192, the waveform corrector 126 compares the total normal PWM period counter to the total normal PWM period variable to determine whether the total number of normal PWM periods for the current waveform cycle have already been performed. If so, control proceeds to blocks 196 and 197 where the normal interval counter is incremented and the PWM period register 150 is set to the extended PWM period value.

If the total number of PWM periods have not been executed for the current waveform (block 192), the waveform corrector 126 determines whether it is time for a normal PWM period (block 193). If it is time for a normal PWM period, the normal interval counter is reset (block 194), the value in the PWM period register 150 is set to the normal PWM period value (block 195) and control returns to block 174 of FIG. 14 to await the initiation of the next interval. If it is not time for a normal PWM period (block 193), the waveform corrector 126 increments the normal interval counter (block 196), the value in the PWM period register 150 is set to the extended PWM period value (block 197), and control returns to block 174 of FIG. 14 to await the occurrence of the next interval.

From the foregoing, persons of ordinary skill in the art will appreciate that a DVCO 84 has been disclosed that generates an oscillating output signal whose frequency has the stability typically associated with crystal VCOs but with a flexible frequency adjustment range that is greater than ranges associated with crystal VCOs. Such persons will also appreciate that the disclosed DVCO 84 is low cost relative to its performance. Additionally, persons of ordinary skill in the art will appreciate that the DVCO 84 is not limited to linear control relationships between input and frequency, but instead can be used with a wide variety of control relationships (including non-linear relationships) which are selected to suit the needs of the intended application. Furthermore, it will be appreciated that the disclosed DVCO 84 is flexible in that it can be programmed to develop different output waveforms including by way of examples, not limitations, sinusoidal, sawtooth and/or trapezoidal waveforms.

From the foregoing, persons of ordinary skill in the art will readily appreciate that inverters have been disclosed that, when operated in parallel in an AC power supply, achieve load sharing and phase matching without the use of common circuitry or wiring. Persons of ordinary skill in the art will also appreciate that the disclosed inverters 30 achieve reduced complexity and reduced costs in that the same phase locked loop can be used for initial phase lock prior to bringing an inverter on-line and for reduction of cross-conduction currents after the inverter is on-line. It will further be appreciated that the disclosed inverters are also advantageous in that they achieve load sharing without being susceptible to single fault errors inherent in the prior art common control circuitry techniques.

Although certain embodiments of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. For use with a system for supplying AC power to a load via a bus, the system developing a bus voltage on the bus and including first and second inverters, the first and second inverters being connected in parallel and operating at substantially the same frequency, a control circuit associated with the first inverter for reducing cross conduction current between the first and second inverters, the control circuit comprising:
    a phase detector for developing a difference signal proportional to a difference between an input signal representative of an output current of the first inverter and a reference signal;
    a filter cooperating with the phase detector for smoothing and sampling the difference signal; and
    a signal generating circuit for adjusting the phase of an output voltage of the first inverter, the phase of the output voltage being dependent upon the difference signal, the signal generating circuit developing the reference signal, the reference signal being substantially representative of the output voltage of the first inverter but approximately 90 degrees out of phase with the output voltage, wherein the phase detector, the filter, and the signal generating circuit cooperate to match the phase of the output voltage of the first inverter to the phase of the output voltage of the second inverter to thereby reduce cross conduction current flowing between the first and second inverters.

2. A control circuit as defined in claim 1 further comprising a controlled switch coupled to the phase detector for delivering the input signal thereto.

3. A control circuit as defined in claim 2 wherein the controlled switch has a first state wherein the input signal delivered to the phase detector is representative of the bus voltage, and a second state wherein the input signal delivered to the phase detector is representative of the output current developed by the first inverter.

4. A control circuit as defined in claim 3 wherein, when the controlled switch is in the second state, the phase detector, the filter and the signal generating circuit cooperate to reduce cross conduction current flowing between the first and second inverters.

5. A control circuit as defined in claim 3 wherein, when the controlled switch is in the first state, the phase detector, the filter, and the signal generating circuit cooperate to substantially match the phase of the output voltage of the first inverter to the phase of the bus voltage.

6. A control circuit as defined in claim 1 wherein the phase detector comprises a multiplier.

7. A control circuit as defined in claim 1 wherein the filter comprises a resettable integrator for developing an average difference signal over a first predetermined time period.

8. A control circuit as defined in claim 1 wherein the signal generating circuit comprises a voltage controlled oscillator for developing a phase correcting signal and the reference signal.

9. A control circuit as defined in claim 8 further comprising an isolator in communication with the signal generating circuit for selectively preventing the output voltage of the first inverter from reaching the bus until the bus voltage and the output voltage of the first inverter are substantially in phase.

10. A control circuit as defined in claim 9 wherein the voltage controlled oscillator comprises a microcontroller coupled to the isolator, and the microcontroller controls the isolator to connect the output voltage of the first inverter to the bus when the average difference signal remains substantially constant for a second predetermined time period.

11. A control circuit as defined in claim 10 further comprising a controlled switch coupled to the phase detector for delivering the input signal thereto, the controlled switch having a first state wherein the input signal delivered to the phase detector is representative of the bus voltage, and a second state wherein the input signal delivered to the phase detector is representative of the output current developed by the first inverter, the microcontroller being coupled to the controlled switch for switching the controlled switch between the first and the second states.

12. A control circuit as defined in claim 1 further comprising means for matching an amplitude of the output voltage of the first inverter and an amplitude of an output voltage of the second inverter.

13. A control circuit as defined in claim 12 wherein the matching means comprises a current sense resistor coupled to the first inverter to cause a decrease in the output voltage of the first inverter in response to an increase in load current.

14. A system for supplying power to a load via a bus, the system comprising:
    a first inverter coupled to the bus and developing a first output voltage and a first output current;
    a second inverter coupled to the bus in parallel with the first inverter; and
    a control circuit associated with the first inverter, the control circuit including a phase detector to detect a phase difference between the first output current and the first output voltage and a controlled oscillator adjusting the phase of the first output voltage based upon the detected phase difference, the phase detector being disposed in a phase locked loop with the controlled oscillator to reduce the detected phase difference to thereby reduce a quadrature current flowing between the first and second inverters.

15. A system as defined in claim 14 further comprising a second control circuit associated with the second inverter, the second control circuit including: (1) a second phase detector to detect a phase difference between a second output current associated with the second inverter and a second output voltage associated with the second inverter and (2) a second controlled oscillator adjusting the phase of the second output voltage based upon the phase difference detected by the second phase detector, the second phase detector being disposed in a second phase locked loop with the second controlled oscillator to reduce the phase difference detected by the second phase detector to thereby reduce the quadrature current flowing between the first and second inverters.

16. A system as defined in claim 14 further comprising means for matching an amplitude of the output voltage of the first inverter and an amplitude of an output voltage of the second inverter.

17. A system as defined in claim 16 wherein the matching means comprises a first current sense resistor coupled to the first inverter to cause a decrease in the output voltage of the first inverter in response to an increase in load current and a second current sense resistor coupled to the second inverter to cause a decrease in the output voltage of the second inverter in response to an increase in the load current.

18. For use with a system for supplying power to a load via a bus, the system developing a bus voltage on the bus and including first and second inverters, the first and second inverters being connected in parallel and operating at substantially the same frequency, a control circuit associated with the first inverter comprising:
a controlled switch having a first state and a second state; and
a phase locked loop having an input coupled to the controlled switch such that, when the controlled switch is in the first state, the phase locked loop compares a signal representative of the bus voltage to a reference signal derived from an output voltage of the first inverter to drive the output voltage of the first inverter into substantial phase with the bus voltage, and, when the controlled switch is in the second state, the phase locked loop compares a signal derived from an output current of the first inverter to the reference signal derived from the output voltage of the first inverter to reduce a cross conduction current flowing between the first and second inverters.

19. A control circuit as defined in claim 18 wherein the cross conduction current has a quadrature component and the phase locked loop reduces the quadrature component of the cross conduction current.

20. A method of reducing cross conduction current flowing between at least two parallel inverters in a redundant power supply comprising the steps of:
providing a reference signal which is approximately 90 degrees out of phase with an output voltage of a first one of the inverters;
providing an input signal representative of an output current of the first inverter;
multiplying the input signal and the reference signal to develop a difference signal;
filtering and sampling the difference signal; and
adjusting the phase of the output voltage of the first inverter and the reference signal to reduce the difference signal whereby cross conduction current flowing between the at least two parallel inverters is reduced.

21. A method as defined in claim 20 further comprising the step of integrating the difference signal over a predetermined time period.

22. A method as defined in claim 21 wherein the step of filtering and sampling the difference signal is performed by periodically filtering and sampling the integrated difference signal.

23. A control circuit as defined in claim 1 wherein the cross conduction current flowing between the first and second inverters is reduced without employing common control circuitry between the first and second inverters.

24. A system as defined in claim 14 wherein the quadrature current flowing between the first and second inverters is reduced without employing common control circuitry between the first and second inverters.

25. A control circuit as defined in claim 18 wherein the cross conduction current flowing between the first and second inverters is reduced without employing common control circuitry between the first and second inverters.

26. A method as defined in claim 20 wherein the cross conduction current flowing between the at least two parallel inverters is reduced without employing common control circuitry between the at least two parallel inverters.

27. A control circuit as defined in claim 1 wherein the second inverter is provided with a second control circuit comprising:
a second phase detector for developing a second difference signal proportional to a second difference between a second input signal representative of an output current of the second inverter and a second reference signal;
a second filter cooperating with the second phase detector for smoothing and sampling the second difference signal; and
a second signal generating circuit for adjusting the phase of an output voltage of the second inverter, the phase of the output voltage of the second inverter being dependent upon the second difference signal, the second signal generating circuit developing the second reference signal, the second reference signal being substantially representative of the output voltage of the second inverter but approximately 90 degrees out of phase with the output voltage of the second inverter, wherein the second phase detector, the second filter, and the second signal generating circuit cooperate to match the phase of the output voltage of the second inverter to the phase of the output voltage of the first inverter to thereby reduce cross conduction current flowing between the first and second inverters.

28. A control circuit as defined in claim 18 wherein the second inverter is provided with a second control circuit comprising:
a second controlled switch having a first state and a second state; and
a second phase locked loop having an input coupled to the second controlled switch such that, when the second controlled switch is in the first state, the second phase locked loop compares a signal representative of the bus voltage to a second reference signal derived from an output voltage of the second inverter to drive the output voltage of the second inverter into substantial phase with the bus voltage, and, when the second controlled switch is in the second state, the second phase locked loop compares a signal derived from an output current of the second inverter to the second reference signal derived from the output voltage of the second inverter to reduce a cross conduction current flowing between the first and second inverters.

29. A method as defined in claim 20 further comprising the steps of:

provide a second reference signal which is approximately 90 degrees out of phase with an output voltage of a second one of the inverters;

providing a second input signal representative of an output current of the second inverter;

multiplying the second input signal and the second reference signal to develop a second difference signal;

filtering and sampling the second difference signal; and adjusting the phase of the output voltage of the second inverter and the second reference signal to reduce the difference signal whereby cross conduction current flowing between the at least two parallel inverters is reduced.

* * * * *